United States Patent
Ishii et al.

(10) Patent No.: US 7,466,915 B2
(45) Date of Patent: Dec. 16, 2008

(54) MIRROR CONTROLLER FOR OPTICAL SWITCH

(75) Inventors: Yuji Ishii, Yokohama (JP); Kazuyuki Mori, Kawasaki (JP); Tamotsu Akashi, Kawasaki (JP); Yoshio Sakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 518 days.

(21) Appl. No.: 11/038,056

(22) Filed: Jan. 21, 2005

(65) Prior Publication Data

US 2006/0088317 A1   Apr. 27, 2006

(30) Foreign Application Priority Data

Oct. 27, 2004   (JP) ............... 2004-312375

(51) Int. Cl.
H04J 14/00   (2006.01)
H04B 10/00   (2006.01)

(52) U.S. Cl. .......................... 398/56; 398/131

(58) Field of Classification Search ............ 398/55–57, 398/129, 131
See application file for complete search history.

(56) References Cited

U.S. PATENT DOCUMENTS 6,263,123 B1 * 7/2001 Bishop et al. ............ 385/15
6,498,668 B1 * 12/2002 Korevaar ................. 398/129
6,798,992 B1 * 9/2004 Bishop et al. ............ 398/45
7,236,704 B1 * 6/2007 Cao ........................ 398/83
2002/0109076 A1   8/2002 Tochio et al.

FOREIGN PATENT DOCUMENTS

| CA | 2 324 182 | 5/2001 |
|----|-----------|--------|
| JP | 2001-174723 | 6/2001 |
| JP | 2002-236264 | 8/2002 |

* cited by examiner

Primary Examiner—Jason Chan
Assistant Examiner—Nathan M Curs
(74) Attorney, Agent, or Firm—Staas & Halsey LLP

(57) ABSTRACT

A mirror controller of an optical switch comprises a signal generator (10, 82, 83) for passing the optical signal on the same light path as the one for optical communication using the optical switch, and an image analyzer (15, 16, 81) detecting the optical signal as the light scattered by at least one of tilt mirrors (111, 123) and an output collimator array (14). The image analyzer detects the position of the light beam image as a control position (121, 141, 85) based on the scattered light, and controls the tilt mirrors in such a manner that the detected control position coincides with the predetermined desired target position (122, 142, 84, 86) on at least one of the tilt mirrors and the output collimator array. The mirror controller can realize the connection test of the optical signal between input and output with high accuracy and reliability.

8 Claims, 10 Drawing Sheets

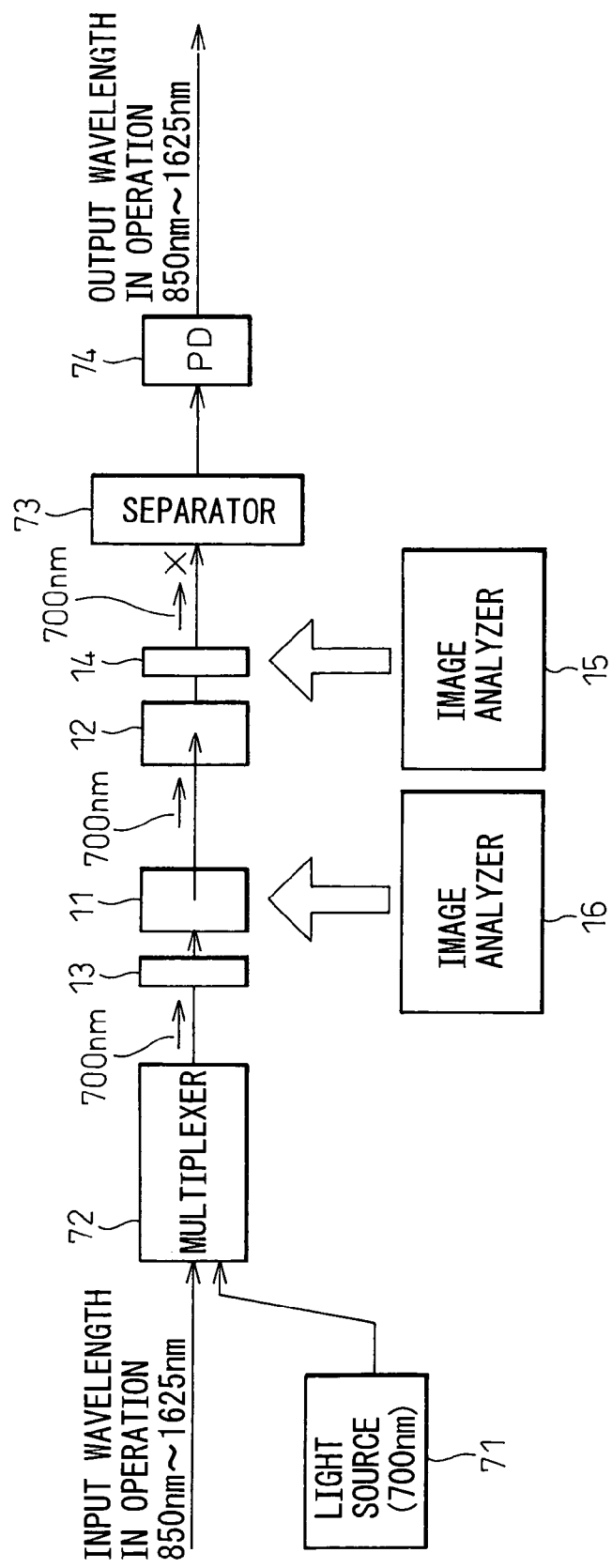

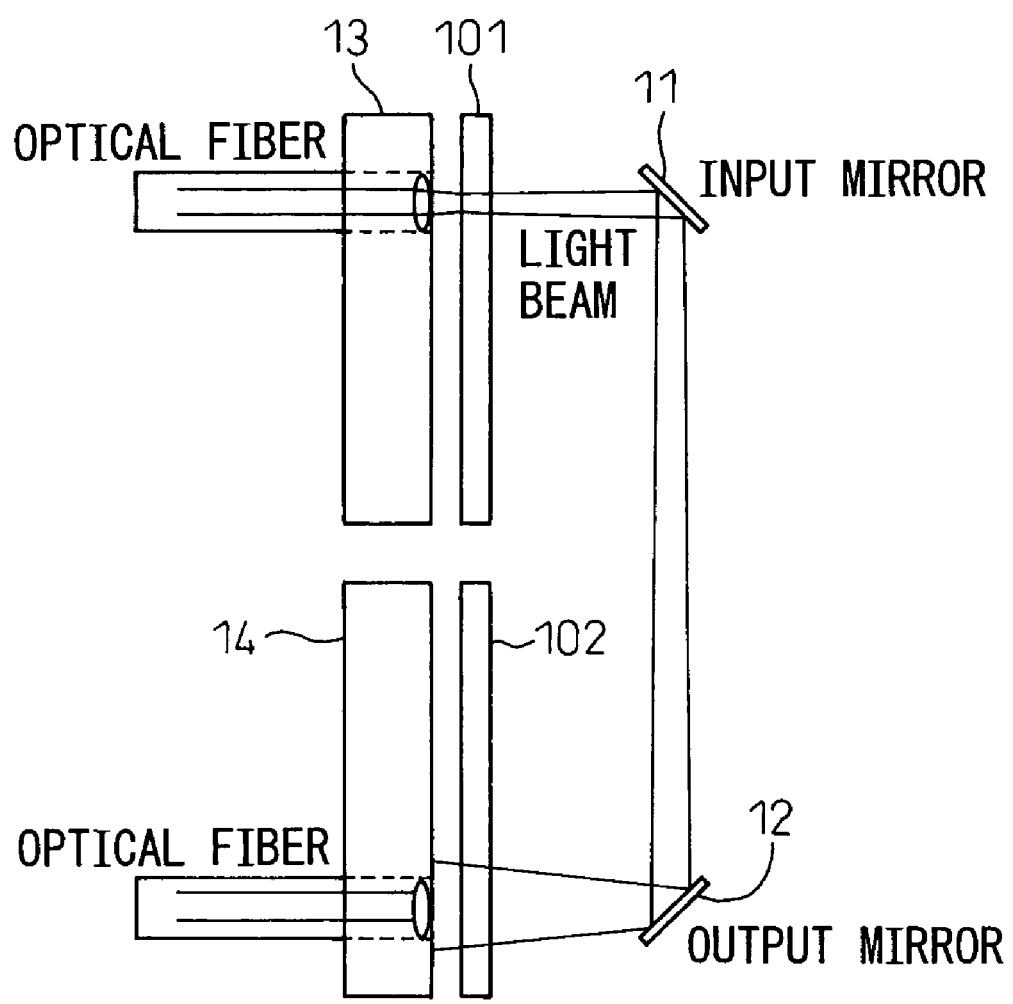

MIRROR CONTROLLER FOR OPTICAL SWITCH

CROSS-REFERENCE TO RELATED APPLICATIONS

This application is based upon and claims the priority of Japanese Patent Application No. 2004-312375, filed Oct. 27, 2004, the contents being incorporated herein by reference.

BACKGROUND OF THE INVENTION

1. Field of the Invention

The present invention relates to a mirror controller of an optical switch in an optical cross-connect (OXC) system for wavelength division multiplexing (WDM) communication or, in particular, to a mirror controller suitably used for an optical switch using a MEMS (micro electro-mechanical system) mirror.

2. Description of the Related Art

An optical cross-connect system using the MEMS mirror is disclosed in Japanese Unexamined Patent Publications. No. 2002-236264 (Patent Document 1) and No. 2001-174723 (Patent Document 2).

Patent Document 1 proposes a device and a method for controlling an optical switch, in which the angular displacement of the MEMS mirror used for the optical switch is automatically corrected thereby to reduce the optical loss. This method is divided into a method in which part of an optical signal is branched by reflection on a mirror the like and the positional information of the branch light is obtained thereby to detect the angular displacement of the mirror, and a method in which the angular displacement of the mirror is detected by detecting the power of the optical signal output from an output port.

Patent Document 2, on the other hand, proposes a device and a method for detecting the rotational drift of the MEMS mirror element used in an optical switch. In order to optically detect the rotational drift of the mirror, in addition to the optical path for optical communication, a test light is radiated on the mirror and the drift of the mirror is detected using an optical monitor (camera, etc.).

In the technique described in Patent Document 1, part of the optical signal is branched, and the positional information of the branch light is obtained thereby to detect the angular displacement of the mirror. The problem, however, is that although the angular displacement of the mirror can be detected by the branch light, the insertion loss as an optical switch is increased by branching the output light. The insertion loss is an important factor of the performance of the optical switch and, therefore, an optical switch control device with a low insertion loss is required.

Also, in the technique described in Patent Document 1, the angular displacement is detected by detecting the power of the optical signal output from the output port, and the control operation is impossible without the optical output. In the initial state, i.e. not yet optically connected, or in the case of some macroscopic variation, therefore, the optical connection cannot be controlled.

Further, in the technique of Patent Document 1, the optical signal input from an input collimator is reflected on an input mirror, and after being reflected on an output mirror, is output from the desired output collimator. The optical output level of the optical signal thus output is monitored by a photodiode or the like. In this way, the point or level is optimally controlled. In the case where the displacement of the initial angle is considerable, however, the problem is posed that the optical signal is not output from the output collimator and therefore the optical output cannot be monitored using the photodiode or the like.

Patent Document 2, on the other hand, discloses a technique for detecting the drift. The technique of Patent Document 2, however, has the problem that an optical path for the test signal other than that of the actual optical signal is required for the monitor operation, and any trouble of the optical signal due to the fault of the input fiber or the angular error between the input light and the test signal which may occur cannot be detected. In the case where the optical switch is used for WDM transmission, a very high reliability is required. The MEMS mirror, however, is not yet sufficiently reliable, and therefore the technique of Patent Document 2 using an optical path for the test signal, in addition to the light path of the actual optical signal, cannot solve the problems described above. Also, the technique of Patent Document 2 deals with the position of a MEMS mirror array but not the relation with the actual optical signal (the optical signal passing through a light path that can be switched by a mirror).

SUMMARY OF THE INVENTION

The object of this invention is to solve the problems of the prior art described above and provide a mirror controller for an optical switch, wherein the optical signal on the same light path (a switchable light path) as that of the optical signal used in actual applications is monitored by a camera, so that the connection test (connection check) of the input and output of the optical switch using the optical signal is realized with high accuracy and reliability.

In order to achieve the object described above, according to a first aspect of the invention, there is provided a mirror controller for an optical switch, comprising a signal generating part for passing an optical signal on the same light path as that for the optical communication using an optical switch, and an image analyzer for detecting the light of the optical signal scattered by at least one tilt mirror and an output collimator array, wherein the image analyzer detects the position of a light beam image as a control position based on the scattered light and controls the tilt mirror in such a manner that the control position detected coincides with a desired target position predetermined by at least one tilt mirror and the output collimator.

According to a second aspect of the invention, there is provided a mirror controller for an optical switch including an input mirror array and an output mirror array contained in a mirror array, an input collimator array arranged at a position corresponding to the input mirror array and an output collimator array arranged at a position corresponding to the output mirror array, wherein the image analyzer includes a first image analyzer and a second image analyzer, the first image analyzer detecting, as a first control position, the position of the light beam image on the output mirror array based on the optical signal output from the signal generating part, passed through the input collimator array, reflected on the output mirror array and then scattered by the output mirror array, the first image analyzer controlling the tilt mirrors on the input mirror array in such a manner that the first control position detected coincides with a predetermined desired first target position of the output tilt mirror, the second image analyzer detecting, as a second control position, the position of the light beam image on the output collimator, based on the light reflected on the output mirror array and scattered by the output collimator array, the second image analyzer controlling the tilt mirrors on the output mirror array in such a manner that the detected second control position coincides with a predetermined desired second target position of the output collimator array.

According to a third aspect of the invention, there is provided a mirror controller for an optical switch including an input mirror array, an output mirror array, an input collimator array and an output collimator array, similar to those in the second aspect of the invention, wherein the signal generating part includes a first optical signal generator and a second optical signal generator, wherein a single image analyzer making up the image analyzer detects, as a first control position, the position of the light beam image on the output mirror array by detecting the optical signal output from the first signal generator, passed through the input collimator array, reflected on the input mirror array and then scattered by the output mirror array, the single image analyzer controlling the tilt mirrors on the input mirror array in such a manner that the detected first control position coincides with a first desired target position constituting the position of the light radiated on the output mirror array through the output collimator array by the second signal generator, wherein the single image analyzer further detects, as a second control position, the position of the light beam image on the input mirror array based on the optical signal output from the second signal generator, passed through the output collimator, reflected on the output mirror array and then scattered by the input mirror array, the single image analyzer controlling the tilt mirrors on the output mirror array in such a manner that the detected second control position coincides with a second desired target position constituting the position of the light radiated on the input mirror array through the input collimator array by the first signal generator.

According to a fourth aspect of the invention, there is provided a mirror controller for controlling the angle of the reflection surface of an optical switch for selectively leading the input optical signal to one of a plurality of outputs by reflection on a mirror array having a reflection surface of a variable angle, wherein the position, at which the optical signal reflected on a mirror of the mirror array is radiated on the particular mirror, is detected by a camera from outside the main light path of the optical signal reflected on the mirror array, and the angle of the reflection surface is controlled based on the detected position of radiation.

According to a fifth aspect of the invention, there is provided a mirror controller for an optical switch including a part for reflecting the input optical signal on a mirror array having a reflection surface of a variable angle and leading the input optical signal selectively to one of a plurality of outputs, and a plurality of optical parts irradiated with the optical signal in the process, wherein the optical parts of the optical switch irradiated with the input optical signal are monitored from outside the main light path of the input optical signal and the position of radiation of the input optical signal is detected by a camera thereby to control the angle of the reflection surface of the mirror array based on the detected radiation position.

In the first aspect of the invention, the tilt mirrors are controlled using the optical signal that has passed through the same light path the optical signal used in actual applications. As compared with the prior art using another light path than the light path of the optical signal used in actual applications, therefore, the optical switch can be controlled with high accuracy and high reliability.

In the second aspect of the invention, the tilt mirrors of the input mirror array are controlled in such a manner that the control position on the output mirror array is superposed with the target position using the optical signal that has passed through the same light path as the optical signal used in actual applications, and the tilt mirrors of the output mirror array are controlled in such a manner that the control position on the output collimator is superposed with the target position. The tilt mirrors of the two mirror arrays thus can be controlled with high accuracy.

In the third aspect of the invention, the target position on the output mirror array is irradiated by the first optical signal generator and the target position on the input mirror array by the second optical signal generator. Therefore, the labor of calculating and registering the target position in advance is eliminated. Also, the use of a single image analyzer simplifies the configuration of the optical switch controller, thereby contributing to a lower cost thereof.

In the fourth aspect of the invention, the position where the mirror is irradiated is monitored from outside the main light path of the optical signal reflected on the mirror array, and therefore the angle of the reflection surface of the optical switch can be controlled with high accuracy and high reliability.

In the fifth aspect of the invention, a plurality of optical parts irradiated with the optical signal are monitored from outside the main light path of the optical signal thereby to detect the radiated position of the input optical signal. Even in the case where various optical parts exist between input and output, therefore, the angle of the reflection surface of the optical switch can be controlled with high accuracy and high reliability.

BRIEF DESCRIPTION OF THE DRAWINGS

FIG. 7 is a block diagram illustrating a modification of the first embodiment.

FIG. 12 is a side view of the optical switch after arranging the light diffusion sheet shown in FIG. 10.

DESCRIPTION OF THE PREFERRED EMBODIMENTS

Figure 1:
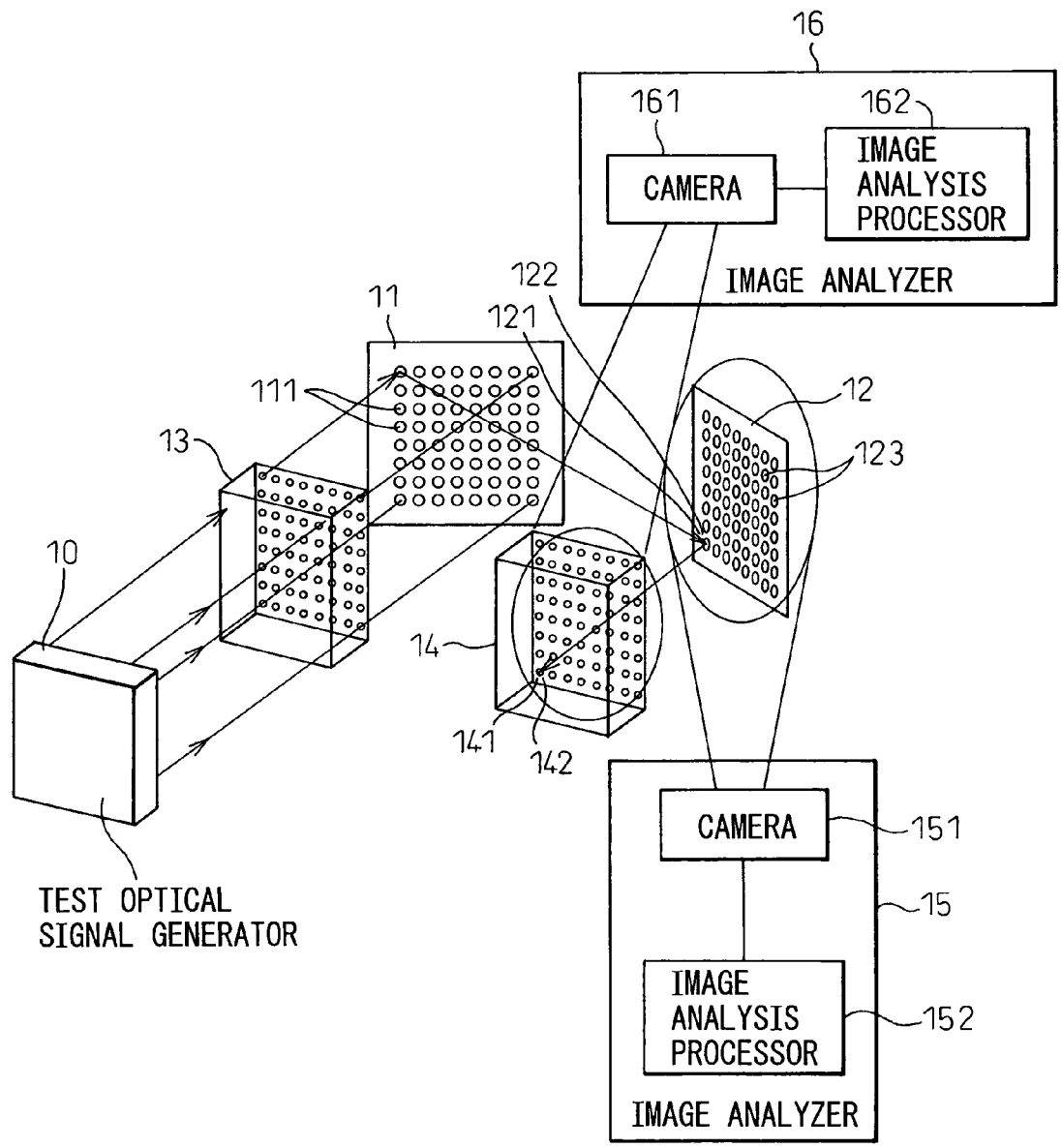
FIG. 1 is a schematic diagram showing a general configuration of an optical switch controller according to a first embodiment of the invention.

Embodiments of the invention are explained below with reference to the drawings. In all the drawings, the same reference numeral designates the same component part.

First Embodiment

FIG. 1 is a schematic diagram showing a general configuration of an optical switch controller according to a first embodiment of the invention. In FIG. 1, the optical switch controller comprises an optical signal generator (signal generating part) 10 for testing (hereinafter referred to as the test optical signal generator 10) which passes the test optical signal on the same light path as for the optical communication using the optical switch, and image analyzers (image analysis part) 15, 16 for detecting the test optical signal as the light scattered by output tilt mirrors 123 and an output collimator array 14. The image analyzers 15, 16 detect the position of the light beam image as control positions 121, 141 based on the scattered light, and control the tilt mirrors 111, 123 in such a manner that the detected control positions 12, 14 coincide with the predetermined desired target positions 122, 124 on the output tilt mirror 123 and the output collimator array 14.

More specifically, the optical switch shown in FIG. 1 also includes an input mirror array 11 and an output mirror array 12 as mirror arrays. An input collimator array 13 is arranged in opposed relation to the input mirror array 11, and an output collimator array 14 is arranged in opposed relation to the output mirror array 12. The input mirror array 11 and the output mirror array 12 are arranged to configure a roof-type folded mirror, for example. The image analyzer includes the first image analyzer 15 and the second image analyzer 16.

The first image analyzer 15 detects, as a first control position 121, the position of the light beam image on the output mirror array 12 based on the test optical signal output from the test optical signal generator 10, passed through the input collimator array 13, reflected on the input mirror array 11 and then scattered as light by the output mirror array 12. The first image analyzer 15 thus controls the tilt mirrors 111 on the input mirror array 11 in such a manner that the detected first control position 121 coincides with the predetermined first desired target position 122 of the output tilt mirror 12.

The second image analyzer 16 detects, as a second control position 141, the position of the light beam image on the output collimator array 14 based on the light beam image reflected on the output mirror array 12 and scattered by the output collimator array 14. The second image analyzer 16 thus controls the tilt mirrors 123 on the output mirror array 12 in such a manner that the detected second control position 141 coincides with the predetermined second desired target position 142 of the output collimator array 14.

As a specific control method, the positions of the output mirror array 12 and the output collimator array 14 are already known from the geometric array thereof. The first target position 122 is determined in such a manner that the images of the positions of the tilt mirrors 123 at the four corners of the output mirror array 12 are picked up in advance by the camera 151, and based on these four corners positions of the tilt mirrors 21, the positions of all the tilt mirrors required for the test are calculated and stored by the image analysis processor 152. As an alternative, the whole image of the output mirror array 12 is picked up in advance by use of the image analyzer 15, and from this whole image, the position of each tilt mirror is registered in advance using the mouse or the like. Similarly, the second target position 142 is determined in such a manner that the images of the positions of the lenses on the four corner holes of the output collimator array 14, for example, are picked up in advance by the camera 151 and, based on the positions of the lenses at the four corners, the positions of all the lenses required for the test are calculated and stored by the image analysis processor 162. As an alternative, the whole image of the output collimator array 14 is picked up in advance using the image analyzer 162, and from this whole image, the position of each lens is registered using the mouse or the like.

Each tilt mirror has a very smooth reflection surface on which the light is substantially totally reflected. Actually, however, a gas such as nitrogen is sealed in a multilayer filter for protection against oxidization and dust. This multilayer filter, though designed to transmit a specific wavelength without reflection, scatters the light very slightly. More light is scattered at other than the specific wavelength. For the wavelength of 1510 nm, 1520 nm and so forth within the band used in the embodiments of the invention, more light is diffused. Even in the case where the light is totally reflected on the tilt mirrors, therefore, the slight light scattering which occurs in the multilayer filter just above the tilt mirrors makes it possible to monitor a light beam spot as the scattered light by an infrared filter which can be attached to the camera 151.

In similar fashion, the light is scattered slightly from each lens on the output collimator array 14, and therefore the light beam spot can be monitored, as the scattered light, by an infrared filter attached to the camera 161.

Figure 2:
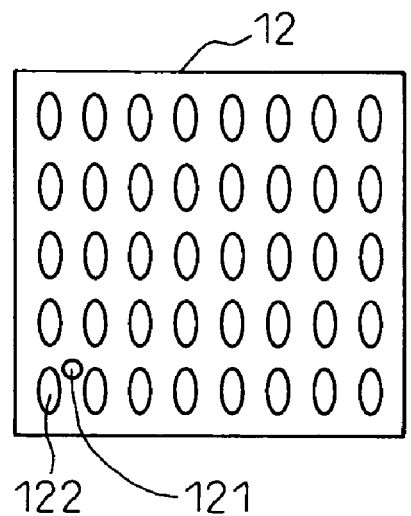
FIG. 2 is an enlarged view of the output mirror array 12.

FIG. 2 is an enlarged view of the output mirror array 12. In FIG. 2, the control position 121 and the target position 122 on the output mirror array 12 are shown. The first image analyzer 15 controls the reflection angle of the tilt mirrors 111 on the input mirror array 11 in such a manner that the control position 121 and the target position 122 coincide with each other.

Figure 3:
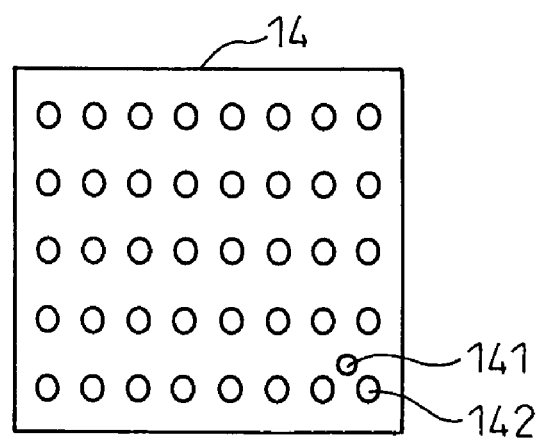
FIG. 3 is an enlarged view of the output collimator array 14.

FIG. 3 is an enlarged view of the output collimator array 14. In FIG. 3, the control position 141 and the target position 142 on the output collimator array 14 are shown. The second image analyzer 16 controls the reflection angle of the tilt mirrors 111 on the output mirror array 12 in such a manner that the control position 141 and the target position 142 coincide with each other.

Figure 4:
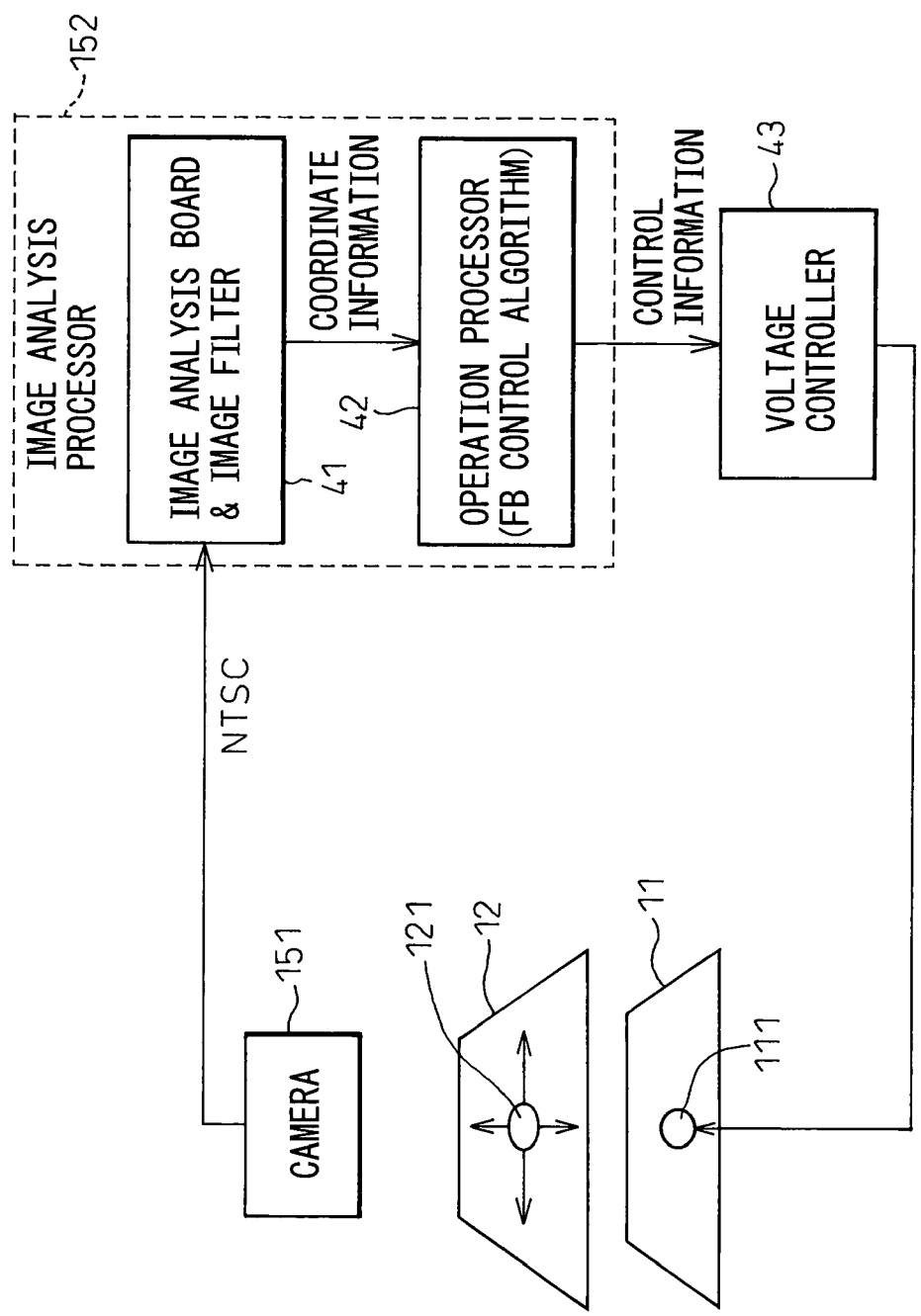
FIG. 4 is a block diagram schematically showing the first image analyzer 15 and the surrounding devices in FIG. 1.

FIG. 4 is a block diagram schematically showing the first image analyzer 15 and the surrounding devices in FIG. 1. In FIG. 4, the first image analyzer 15 includes a block 41 having an image analysis board and an image filter, and an operation processor 42 for executing the feedback control algorithm. The output of the first image analyzer 15 is connected to a voltage controller 43.

The operation of the system shown in FIG. 4 is briefly explained. The camera 151 picks up an image of the control position 121 providing the center coordinate of the light beam radiated on one tilt mirror on the output mirror array 12, and the image pickup signal is input to the block 41 as a NTSC image signal. The center coordinate of the light beam can be detected in the block 41 from the brightness difference between the light beam and the image in the neighborhood of the beam or by image beam processing such as pattern recognition, binarization and image filtering. In this way, the block 41 extracts the coordinate information from the NTSC image signal. The coordinate signal is input to the operation processor 42, and the control information is calculated to superpose the control position 121 on the target position 122 by the feedback control algorithm for comparison with the target position 122 calculated or registered in advance. This control information is applied to the voltage controller 43 so that a drive voltage for controlling the angle of the tilt mirrors 111 of the input mirror array 11 is produced at the output terminal of the voltage controller 43.

The second image analyzer 15 and the neighboring devices and the operation thereof are similar to those shown in FIG. 4 and, therefore, are not shown or described.

Figure 5:
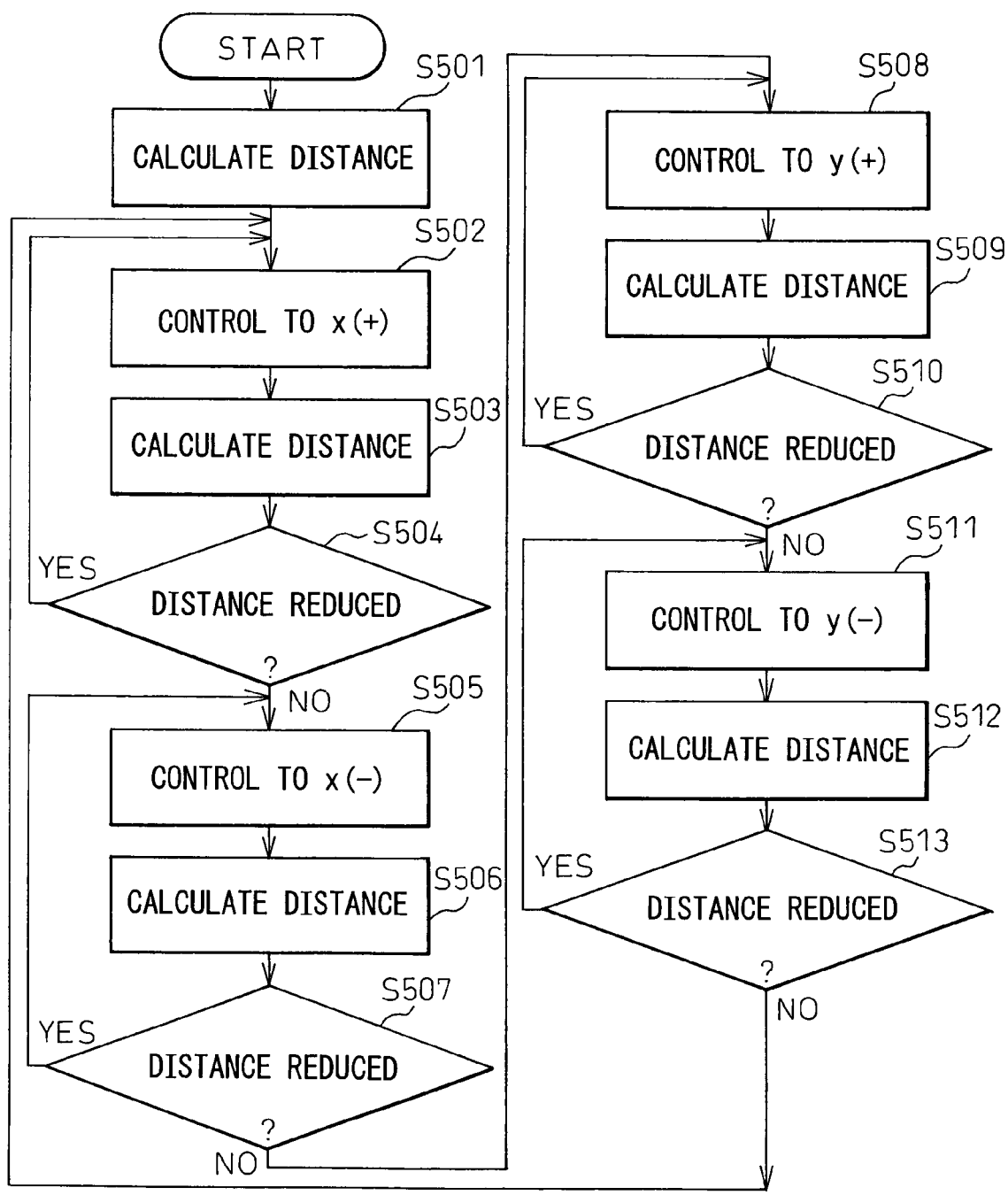
FIG. 5 is a flowchart for explaining the feedback control algorithm for the operation processor 42 shown in FIG. 4.

FIG. 5 is a flowchart for explaining the feedback control algorithm in the operation processor 42 shown in FIG. 4. In FIG. 5, the distance ($Z=\sqrt{X*X+Y*Y}$) between the target coordinate 122 and the control coordinate 121 is determined at step S501. At next step S502, the input mirror is controlled in the direction x(+), followed by step S503 at which the distance ($Z'=\sqrt{(X'*X'+Y'*Y')}$) between the target position 122 and the control coordinate 121 is determined. Then, it is determined whether the controlled distance is shorter than the uncontrolled distance. In the case where the controlled distance is shorter, the direction (x(+)) in which the input mirror is controlled is considered correct, and therefore the process returns to step S502 where the input mirror is controlled to further shorten the distance between the target coordinate 122 and the control coordinate 121. In the case where it is determined that the controlled distance is larger than the uncontrolled distance, on the other hand, the input mirror is controlled in the wrong direction. At step S505, therefore, the control direction is changed to x(−), and the control operation similar to that at steps S503 and S504 is performed at steps S506 and S507. By repeating this control operation, the optimum point in X direction can be determined.

At subsequent steps S508 to S513, the control operation is performed similarly in the Y direction to reduce the distance between the target coordinate 122 and the control coordinate 121 as far as possible. Once the desired tilt mirror position on the output mirror array 12 comes to coincide with the position of the light beam radiated on the output mirror array 12, the tilt mirrors on the output mirror array 12 are controlled to progressively reduce the distance between the desired output collimator position (target coordinate 142) and the light reflected on the output mirror and radiated on the output collimator (control coordinate 141) by a method similar to the one shown in FIG. 5.

Figure 6A:
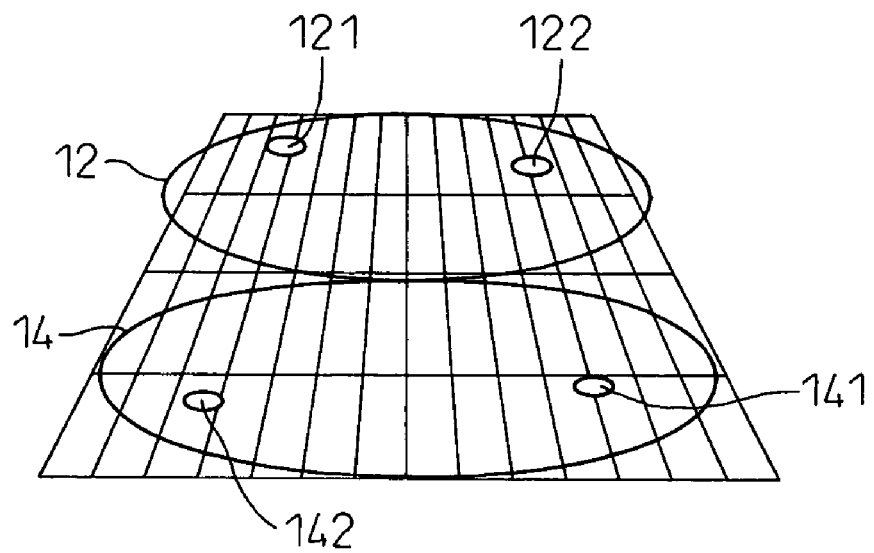
FIGS. 6A and 6B are diagrams for explaining, in an easy-to-understand way, the control operation for determining the control position as near to the target position as possible according to the first embodiment.
Figure 6B:
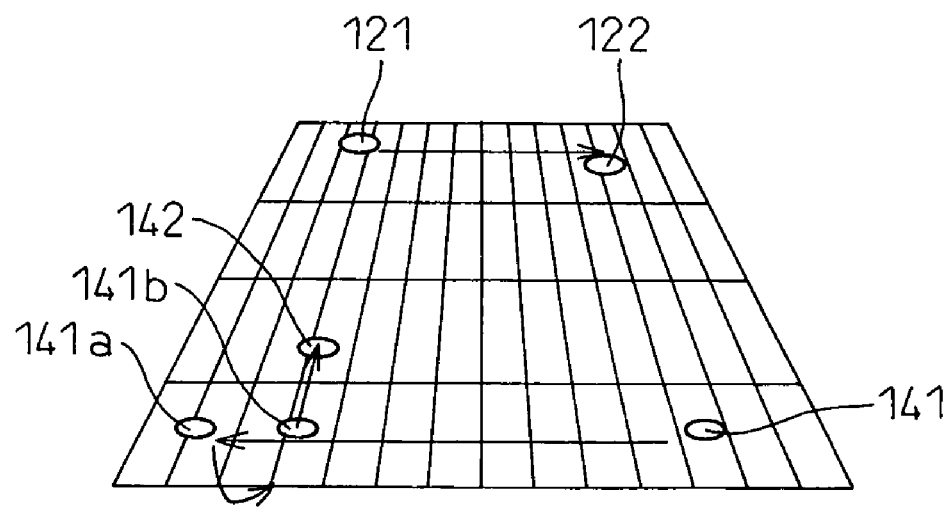

FIGS. 6A and 6B are diagrams for explaining, in an easy-to-understand way, the control operation performed to bring the control position as near to the target position as possible according to the first embodiment. FIG. 6A shows the initial state, and FIG. 6B the state in control. In the initial state, as shown in FIG. 6A, the control position 121 and the target position 122 on the output mirror array 12 is far from each other, and so is the control position 141b on the output collimator array 149 from the target position 142. In the state in control shown in FIG. 6B, however, the control position 121 approaches the target position 122, and finally, the control position 121 and the target position 122 are superposed one on the other. In similar fashion, the control position 141 approaches the target position 142, and finally, the control position 141 and the target position 142 are superposed one on the other. In this case, the control position 141 temporarily assumes the control position 141a and approaches the target position 142. As the control position 141 is still far from the target position 142, the control operation is returned to the control position 141b. In this way, the target position 142 is approached gradually. Then, finally, the control position 141 and the target position 142 are superimposed. The control position 121 is also controlled in a similar way to the control position 141. As a result, the optical signal input from the input collimator array 13 is reflected on the input mirror array 11 and then on the output mirror array 12. Finally, the optical signal is output from the desired position on the output collimator array 14.

In the first embodiment described above, the test optical signal generator 10 is assumed to generate the test optional signal constantly during the test. Nevertheless, the optical signal in actual applications may be used as the test optical signal. In the case where the test is conducted using the optical signal in actual applications and the optical signal is cut off during the packet communication or the like, the control position cannot be monitored any longer and therefore the tilt mirrors cannot be controlled. Thus, the light may not be turned on normally, when the next packet signal is input. In order to solve this problem, a modification of the first embodiment is explained below.

FIG. 7 is a block diagram showing a modification of the first embodiment. In this modification, even in the case where the optical signal is in off state in actual application, the angles of each tilt mirror of the input mirror array 11 and the angle of each tilt mirror of the output mirror array 12 can be optimized on the one hand, and the operation of the input mirror array 11 and the output mirror array 12 can be guaranteed at the same time. A specific example is described below.

In addition to the input mirror array 11, the output mirror array 12, the input collimator array 13, the output collimator array 14, the first image analyzer 15 and the second image analyzer 16, the first embodiment 1 comprises a light source 71 for generating a test optical signal in addition to the optical signal in application (actual data) input to the input collimator array 13, a multiplexer 72 for multiplexing the actual data in application and test optical signal, a separator 73 for separating the test signal from the optical signal in application to prevent the test signal from being output from the output collimator array 14 and affecting the subsequent units in operation, and a photodiode (PD) array 74 for receiving the output of the separator 73.

The optical signal, in application, is often wavelength multiplexed by WDM or the like, and the practical band is usually about 850 nm to 1625 nm. By using, as a test signal, the optical signal in the band (700 nm in the drawing) not used by the optical signal in application, therefore, an effect on the actual data can be avoided. Especially, even while the optical signal is off in actual operation, the image analysis with the test signal is possible, so that the input mirror angle and the output mirror angle can be optimized while at the same time guaranteeing the operation of the input mirror and the output mirror.

Second Embodiment

Figure 8:
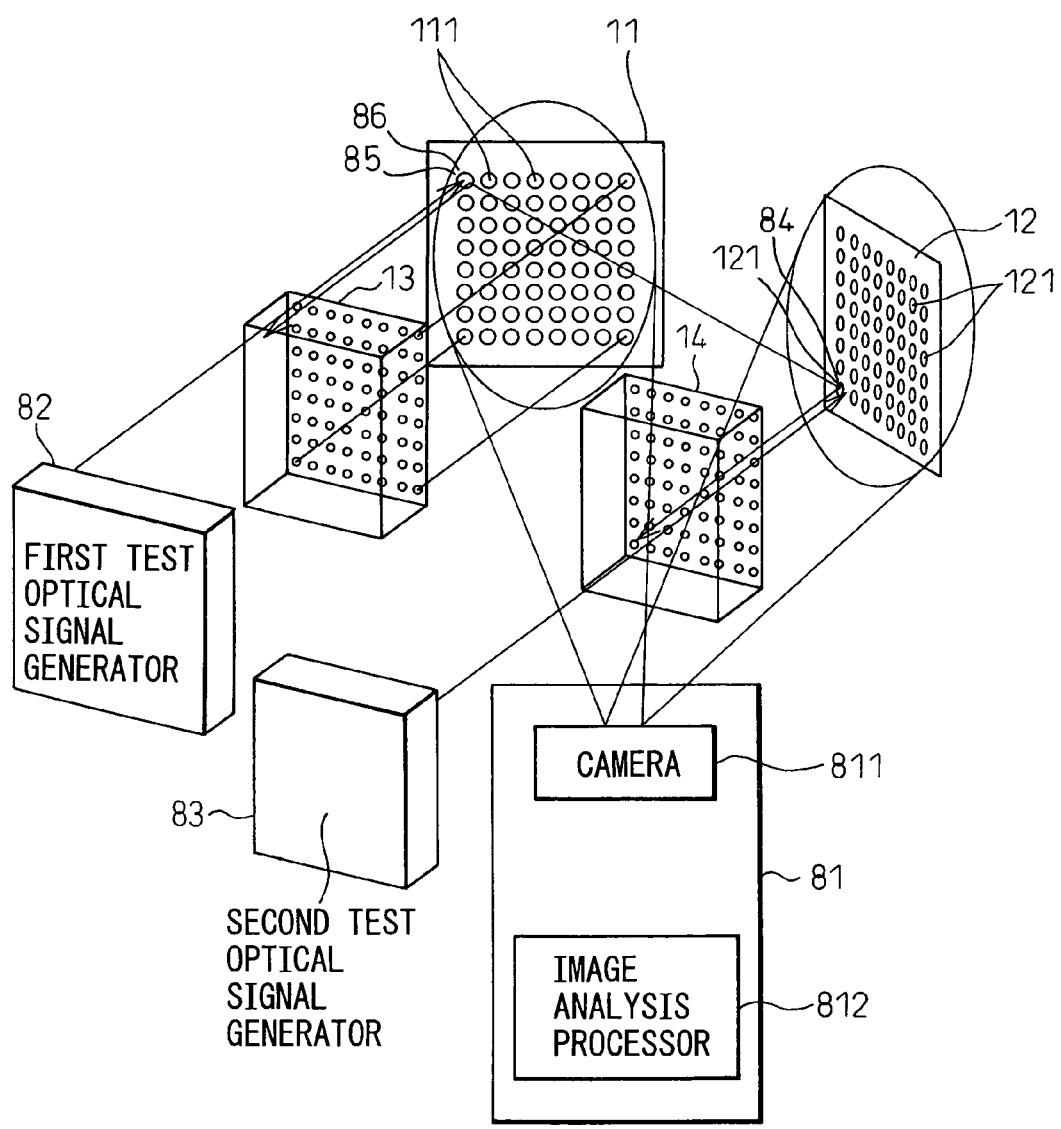
FIG. 8 is a schematic diagram showing a general configuration of the optical switch controller according to a second embodiment of the invention.

FIG. 8 is a schematic diagram showing a general configuration of the optical switch controller according to a second embodiment of the invention. The difference of the configuration shown in FIG. 8 from the configuration shown in FIG. 1 is that the configuration shown in FIG. 2 includes a single image analyzer 81, a first test optical signal generator (first signal generator) 81 and a second test optical signal generator (second signal generator) 82. The image analyzer 81 includes a camera 811 and an image processor 812. The camera 811 picks up an image of the light beam on the input mirror array 11 and an image of the light beam on the output mirror array 12. In the case where the input mirror array 11 and the output mirror array 12 are arranged in proximity to each other as in the roof-type folded mirror, the images of the scattered light from the input mirror array 11 and the scattered light from the output mirror array 12 can be picked up with a single camera and therefore only one image analyzer can be used.

Unlike in the first embodiment requiring two cameras for picking up the images of the output mirror array 12 and the output collimator array 14, the second embodiment, in which the optical signal from the output collimator array 14 is also input and the reflected light is controlled, has the advantage that only one camera is needed.

This embodiment is described below more specifically.

According to the second embodiment, the single image analyzer 81, like in the first embodiment, is so operated that the test optical signal output from the first test optical signal generator 82 is passed through the input collimator array 13, reflected on the input mirror array 11, and scattered on the output mirror array 12. This scattered light is detected, so that the position of the light beam image radiated on the output mirror array 12 is detected as a first control position 121.

According to the second embodiment, the tilt mirrors 111 on the input mirror array 11 are controlled in such a manner that the first control position 121 thus detected coincides with the first desired target position 84 providing the position of the light radiated on the output mirror array 12 through the output collimator array 14 by the second test optical signal generator 83.

Also, the test optical signal output from the second test optical signal generator 83 is passed through the output collimator array 14, reflected on the output mirror array 12, and then scattered on the input mirror array 11. Based on this scattered light, the position of the light beam image radiated on the input mirror array 11 is detected as a second control position 85. The tilt mirrors 123 on the output mirror array 12 are controlled in such a manner that the second control position 85 thus detected coincides with the second desired target position 86 providing the position of the light radiated on the input mirror array 11 through the input collimator array 13 by the first test optical signal generator 82.

According to the second embodiment, the target position is determined by the test optical signal generator using two test optical signal generators. Therefore, a flexible control operation is made possible without any calculation or registration of the position of the input mirror array 11 which otherwise might be required in advance. The method of reducing the distance between the control position 72 and the target position 73 is the same as the method described in the first embodiment.

According to the second embodiment, the optical signal is input also from the output collimator array 14. In conducting the test during the actual optical signal communication, therefore, the optical signal may undesirably leak from the output collimator array 14 to the optical signal source in practical application. To cope with this inconvenience, according to the second embodiment, the initial angle test on the input mirror array 11 and the output mirror array 12 are effectively conducted before the actual practical application. The practical application is also effected by a modification of the second embodiment described below.

Figure 9:
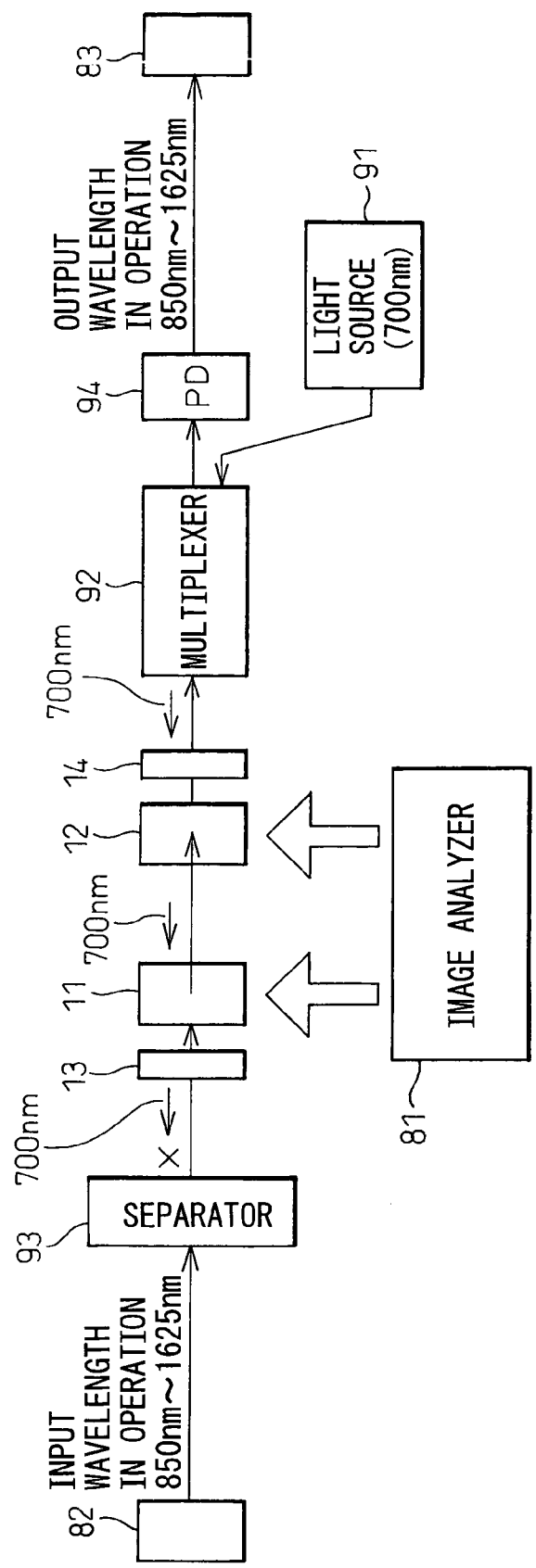
FIG. 9 is a block diagram showing a modification of the second embodiment.

FIG. 9 is a block diagram showing a modification of the second embodiment. In this modification of the second embodiment, if the test is conducted on the optical switch during the practical optical signal communication, and even in the case where the optical signal is turned off in actual applications, the optimization of the angle of each tilt mirror of the input mirror array 11 and each angle of the tilt mirror of the output mirror array 12 and the operation of the input mirror array 11 and the output mirror array 12 can be guaranteed. A specific example is described below.

In FIG. 9, in addition to the first test optical signal generator 82, the input mirror array 11, the output mirror array 12, the input collimator array 13, the output collimator array 14, the image analyzer 81 and the second test optical signal generator 8, the optical switch controller according to this modification of the second embodiment comprises a light source 9 for generating the test optical signal input from the output side, a multiplexer 92 for combining the optical signal (actual data) output in practical operation from the output collimator array 14 and the test optical signal input from the output side, a separator 93 for separating the test signal from the optical signal in operation in such a manner that the test signal is not output from the input collimator and affect the signal source in operation, and a photodiode (PD) array 94 for receiving the output of the multiplexer 92.

As described above, the optical signal in operation is often wavelength multiplexed by WDM or the like and normally has the practical band of about 850 nm to 1625 nm. By using the test optical signal in the band (700 nm in the drawing) not used by the optical signal in operation, the effect on the actual data can be avoided. According to the second embodiment, the effect on the actual control operation system is feared. The use of the method described above, however, eliminates the effect on the control operation system.

Third Embodiment

According to the third embodiment, the optical signal input from the input collimator array 13 or the output collimator array 14 in the first or second embodiment is temporarily diffused by a light diffusion sheet or a lens. Thus, the range of optical connection is enlarged even in the case where a large angular displacement is caused. This is specifically explained below.

Figure 10:
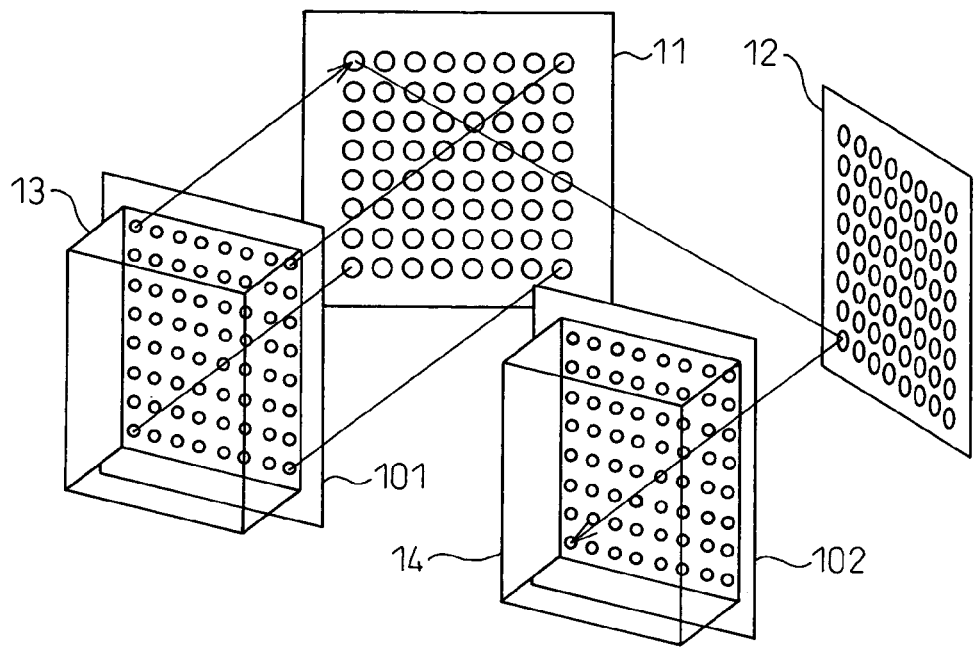
FIG. 10 is a schematic diagram showing a general configuration of the optical switch controller according to a third embodiment of the invention.

FIG. 10 is a schematic diagram showing an optical switch controller according to the third embodiment of the invention. In FIG. 10, the controller according to this embodiment, in addition to the input mirror array 11, the output mirror array 12 and the input collimator array 13 shown in FIGS. 1 and 8, comprises a light diffusion sheet (light diffusion part) 101 arranged on the side of the input collimator array 13 in opposed relation to the input mirror array 11 and a light diffusion sheet (light diffusion part) 102 arranged on the side of the output collimator array 14 in opposed relation to the output mirror array 12. The light diffusion sheets may be replaced by light diffusion lenses with equal effect.

Figure 11:
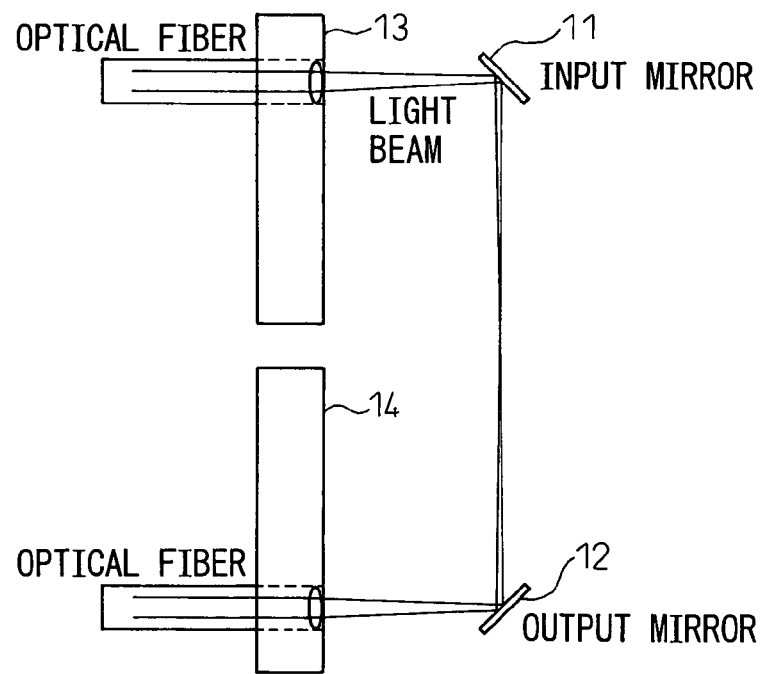
FIG. 11 is a side view of the optical switch before arranging the light diffusion sheet shown in FIG. 10.

FIG. 11 is a side view of the optical switch without the light diffusion sheets shown in FIG. 10, and FIG. 12 a side view of the optical switch with the light diffusion sheets shown in FIG. 10.

In the optical switch shown in FIG. 12, the light diffusion sheet 101 is arranged on the side of the input collimator array 13 in opposed relation to the input mirror array 11, and the light diffusion sheet 102 is arranged on the side of the output collimator array 14 in an opposed relation to the input mirror array 12. By diffusing the optical signal in this way, a slight amount of optical output can be obtained from the output collimator even in the case where the angular displacement is considerable. As a result, the optical output level can be monitored easily using the photodiode or the like.

According to the third embodiment, the optical signal input to the input mirror is diffused by the light diffusion sheets or the lenses, so that even in the case where the angular displacement is considerable, a slight amount of optical output can be obtained from the output collimator. As a result, the optical output level can be monitored easily using the photodiode or the like. According to this embodiment, the displacement of the initial angle is comparatively small. The best initial angle can be secured, therefore, by removing the light diffusion sheets or the lenses subsequently and monitoring the optical output level again at the initial angle acquired by this method.

The embodiments described above refer to the case where the output of the controller is single, but this invention is not limited to such a case.

According to this invention, for example, there is provided a mirror controller for an optical switch to control the angle of the reflection surface of the optical switch for selectively leading the input optical signal to one of a plurality of outputs by reflection on a mirror array having a variable angle reflection surface, wherein the position at which the optical signal reflected on a mirror of the mirror array is monitored from outside the main light path of the optical signal reflected by the mirror array is detected by a camera, and the angle of the reflection surface is controlled based on the position of radiation thus detected.

Also, according to this invention, there is provided a mirror controller for an optical switch having the function of selectively leading the input optical signal to one of a plurality of outputs by reflection on a mirror array having a reflection surface of a variable angle and a plurality of optical parts irradiated by the optical signal in the process thereby to control the angle of the reflection surface, wherein the optical parts of the optical switch irradiated with the input optical signal are monitored from outside the main light path of the input optical signal and the position of radiation detected by a camera, and based on this detected radiation position, the angle of the reflection surface is controlled.

As a result, this invention is applicable even in the case where the optical parts other than the mirror array and the collimator array are inserted between input and output.

With the optical switch controller according to this invention, the insertion loss of the optical signal can be reduced. Also, even in the initial state not optically connected or in the case of some macroscopic variation, the input mirror array and the output mirror array can be optimally controlled while, at the same time, guaranteeing the operation of the input mirror array 11 and the output mirror array 12.

What is claimed is:

1. A mirror controller for an optical switch including a mirror array having a plurality of tilt mirrors for controlling the angle of the reflection surface of the tilt mirrors to lead an input optical signal to a desired position of an output collimator, comprising:
   a signal generating part passing an optical signal on the same light path as an optical communication using the optical switch;
   at least two image analyzers detecting the light of the optical signal scattered by at least one of the tilt mirrors and the output collimator;
   wherein the at least two image analyzers each detects the position of a light beam image as a control position based on the scattered light and controls the tilt mirrors in such a manner that the control position detected coincides with a predetermined desired target position on at least one of the tilt mirrors and the output collimator;
   wherein the optical switch includes an input mirror array and an output mirror array contained in the mirror array, an input collimator array arranged in opposed relation to the input mirror array and the output collimator arranged in opposed relation to the output mirror array;
   wherein the at least two image analyzers include a first image analyzer and a second image analyzer,
   the first image analyzer detecting, as a first control position, the position of the light beam image on the output mirror array based on the optical signal output from the signal generating part, passed through the input collimator array, reflected on the input mirror array and scattered by the output mirror array, the first image analyzer controlling the tilt mirrors on the input mirror array in such a manner that the first control position detected coincides with a predetermined desired first target position of the output tilt mirrors,
   the second image analyzer detecting, as a second control position, the position of the light beam image reflected on the output collimator based on the light beam image reflected on the output mirror array and scattered by the output collimator array, the second image analyzer controlling the tilt mirrors on the output mirror array in such a manner that the detected second control position coincides with a predetermined desired second target position of the output collimator.

2. A mirror controller according to claim 1, further comprising a test wavelength signal multiplexing part multiplexing a test wavelength signal of the optical signal in a band not used for communication from either the input collimator array or the output collimator, with the optical signal in communication, and a test wavelength signal separating part separating only the test wavelength signal from the multiplexed signal.

3. A mirror controller of an optical switch including a mirror array having a plurality of tilt mirrors for controlling the angle of the reflection surface of the tilt mirrors to lead an input optical signal to a desired position of an output collimator, comprising:
   a signal generating part passing an optical signal on the same light path as an optical communication using the optical switch; and
   at least one image analyzer detecting the light of the optical signal scattered by at least one of the tilt mirrors and the output collimator;
   wherein the at least one image analyzer detects the position of a light beam image as a control position based on the scattered light and controls the tilt mirrors in such a manner that the control position detected coincides with a predetermined desired target position on at least one of the tilt mirrors and the output collimator,
   wherein the optical switch includes an input mirror array and an output mirror array as said mirror array, an input collimator array arranged in opposed relation to the input mirror array and the output collimator arranged in opposed relation to the output mirror array,
   wherein the signal generating part includes a first signal generator and a second signal generator,
   wherein the at least one image analyzer is a single image analyzer,
   the single image analyzer detecting, as a first control position, the position of the light beam image radiated on the output mirror array by detecting the optical signal output from the first signal generator, passed through the input collimator array, reflected on the input mirror array and then scattered by the output mirror array, the single image analyzer controlling the tilt mirrors on the input mirror array in such a manner that the detected first control position coincides with a first desired target position of a light radiated on the output mirror array through the output collimator by the second signal generator,
   the single image analyzer detecting, as a second control position, the position of the light beam image radiated on the input mirror array, based on the optical signal output from the second signal generator, passed through the output collimator, reflected on the output mirror array and then scattered by the input mirror array, the single image analyzer controlling the tilt mirrors on the input mirror array in such a manner that the detected second control position coincides with a second desired target position of the light radiated on the input mirror array through the input collimator array by the first signal generator.

4. A mirror controller according to claim 3, further comprising a test wavelength signal multiplexing part multiplexing a test wavelength signal of the optical signal in a band not used for communication from either the input collimator array or the output collimator, with the optical signal in communication, and a test wavelength signal separating part separating only the test wavelength signal from the multiplexed signal.

5. A mirror controller according to claim 3, further comprising at least a selected one of a light diffusing part for diffusing a light beam output from the input collimator array to the input mirror array and a light diffusion part for diffusing the light beam output from the output collimator to the output mirror array.

6. A mirror controller according to claim 3, further comprising at least one of a light diffusing part diffusing the light beam output from the input collimator array to the input mirror array and a light diffusion part for diffusing the light beam output from the output collimator to the output mirror array.

7. A mirror controller according to claim 3, further comprising at least one of a light diffusing part diffusing a light beam output from the input collimator array to the input mirror array and a light diffusion part for diffusing the light beam output from the output collimator to the output mirror array.

8. A mirror controller according to claim 4, further comprising at least one of a light diffusing part diffusing the light beam output from the input collimator array to the input mirror array and a light diffusion part diffusing the light beam output from the output collimator to the output mirror array.

* * * * *